US005767777A

United States Patent [19]
Whitehead

[11] Patent Number: 5,767,777
[45] Date of Patent: Jun. 16, 1998

[54] CONTINUOUS AIR MONITOR ALARM SIMULATOR AND CHART RECORDER SIMULATOR

[75] Inventor: Jeffrey L. Whitehead, Elizabethtown, Pa.

[73] Assignee: GPU Nuclear, Inc., Parsippany, N.J.

[21] Appl. No.: 676,064

[22] Filed: Jul. 5, 1996

Related U.S. Application Data

[60] Provisional application No. 60/001,662, Jul. 31, 1995.
[51] Int. Cl.⁶ ........................................... G08B 17/10
[52] U.S. Cl. .................. 340/632; 340/693; 73/23.42; 364/497; 364/550
[58] Field of Search .................. 340/632, 600, 340/426, 438, 439, 945, 693, 539; 73/23.21, 23.42; 364/510, 497, 550

[56] References Cited

U.S. PATENT DOCUMENTS

| | | |
|---|---|---|
| 3,061,945 | 11/1962 | Hawkins . |
| 3,839,804 | 10/1974 | Amend et al. . |
| 4,032,707 | 6/1977 | Trenary . |
| 4,064,392 | 12/1977 | Desalu . |
| 4,257,039 | 3/1981 | Webb et al. . |
| 4,845,474 | 7/1989 | Moore et al. . |
| 4,932,879 | 6/1990 | Ingenito . |
| 5,008,840 | 4/1991 | De Pierro ........................... 340/577 |
| 5,045,700 | 9/1991 | Crowson et al. . |
| 5,138,302 | 8/1992 | Nagaoka et al. . |
| 5,146,209 | 9/1992 | Beghelli ........................... 340/632 |
| 5,160,264 | 11/1992 | Banura et al. . |
| 5,160,916 | 11/1992 | Ishii et al. . |
| 5,170,150 | 12/1992 | Austin et al. . |
| 5,302,837 | 4/1994 | Sawa et al. . |
| 5,327,119 | 7/1994 | Ishii . |
| 5,331,310 | 7/1994 | Setter et al. . |
| 5,345,479 | 9/1994 | Graham . |
| 5,379,026 | 1/1995 | Whittle ........................... 340/632 |
| 5,382,943 | 1/1995 | Tanaka ........................... 340/632 |
| 5,389,125 | 2/1995 | Thayer et al. ........................... 95/11 |
| 5,400,014 | 3/1995 | Behlke et al. . |
| 5,406,265 | 4/1995 | Trozzo et al. ........................... 340/632 |
| 5,452,234 | 9/1995 | Heath et al. ........................... 340/632 |
| 5,608,384 | 3/1997 | Tikijian ........................... 340/632 |

*Primary Examiner*—Jeffery Hofsass
*Assistant Examiner*—Davetta Woods
*Attorney, Agent, or Firm*—William L. Muckelroy; Gary L. Lipson

[57] ABSTRACT

A method and a system for simulating the conditions that are present during an air quality emergency occurring in a nuclear powered electrical generation plant. The system uses an apparatus which includes a continuous air monitor (C.A.M.) alarm simulator and chart recorder simulator. The C.A.M. alarm simulator comprises a beacon, a siren, an acknowledge button, an internal power source and a digital alarm control. The C.A.M. alarm simulator is capable of being programmed to activate at some predetermined time. The chart recorder simulator is comprised of a chart holder with a window formed therein. A chart indicating the simulated level of airborne nuclear radiation contamination is placed inside the chart holder so that it can be viewed though the window. The chart holder is placed in visual proximity to the C.A.M. alarm simulator. Simulating the air quality emergency comprises the following steps: At least one C.A.M. alarm simulator is programmed to activate at a predetermined time; a corresponding chart recorder simulator is completed to indicate a specific air quality emergency; a C.A.M. alarm simulator and chart recorder simulator are placed at each of various locations within the plant; the C.A.M. alarm simulators activate at the predetermined time; the acknowledge button on each of the C.A.M. alarm simulators are engaged to discontinue the siren while not affecting operation of the beacon; and finally the user periodically advances the charts indicating changing air quality conditions over time.

11 Claims, 4 Drawing Sheets

CONTINUOUS AIR MONITOR ALARM SIMULATOR AND CHART RECORDER SIMULATOR

The applicant claims a filing date of Jul. 31, 1995 based on a provisional application filed by the applicant having a Ser. No. 60/001662.

BACKGROUND

The present invention relates to the training of personnel during an air quality emergency. In particular, the invention relates to a simulated audible and visual continuous air monitor alarm used during emergency drills and training.

All licensees of Nuclear Power Plants in the United States are required by 10 CFR 50 Appendix E and NUREG 0654/FEMA Rep-1 to have an emergency preparedness program which includes an Annual Exercise, an Annual Radiological Monitoring Drill and two Semi Annual Radiological Controls Drills.

The increasing demand for well trained power plant operators, compliance with federal requirements and the complexity of modern day power plants has led to the realization that the simulation is the most effective tool for such training.

Simulators have been used in varying degrees within the nuclear power industry. The prior art discloses design and training simulators that represent the malfunction of certain devices that are used in operating the power plants. There is, however, nothing in the prior art that discloses a method of facilitating a drill exercise relative to the reaction of high levels of airborne radioactivity.

There is a clear need in the industry for a simple, inexpensive and realistic simulation for the purpose of providing an exercise platform to practice techniques for dealing with the emergency conditions that are described herein.

SUMMARY

The present invention is directed to a device that satisfies the need for a simple, inexpensive and realistic simulation for the purpose of providing an exercise platform to practice techniques for dealing with hazardous levels of airborne contaminants. The device comprises a siren, a beacon and a switch mounted in an enclosure containing the necessary power supply and electronic components to operate the device. The device further including a chart recorder simulator to provide a visual indication of the level of airborne contamination.

The simulation device comprises a beacon and a siren as visual and audible indication of simulated high airborne contamination. The elements represent the red strobe and bell on an actual continuous air monitor (C.A.M.) such as the Eberline AMS-3 and are of substantially equivalent in brightness and loudness. However, the beacon and siren on the subject device are adequately dissimilar so that personnel will be able to distinguish between a real emergency and an exercise. The simulation device further includes a switch incorporated into the unit to allow personnel to silence the siren as on a real C.A.M. The simulator device further includes a means to activate the simulation device at some predetermined time.

The typical exercise is conducted over a period of time from about 4 to 7 hours. It is contemplated that the device contains a rechargeable internal power supply capable of supplying operational power to the device for a continuous period from about 4 to 7 hours.

It is contemplated that all controls (except the acknowledge button) are accessible through a clear cover on the bottom of the simulation device. It is further contemplated that the simulation device is sized so as to conveniently fit on top of an in-plant C.A.M and is light enough so that at least six of the simulation devices can be comfortably carried at the same time by a single individual.

It is further contemplated that a chart recorder simulator may be placed in visual proximity to the C.A.M. device. The recorder simulator provides a visual representation of the current reading and trend of the simulated airborne contamination. The visual representation is similar to the strip chart on a real C.A.M such as the Eberline AMS-3. In one embodiment, it is contemplated that the chart recorder simulator comprises a card holder. The card holder comprises chart stock and poster board with a window through which the chart stock can be viewed. A chart being plotted on a strip of paper which slides through the card holder and is manually advanced as required by the specific needs of the exercise.

Another objective of this invention is to provide a lightweight simulation tool that can be carried by a single operator and placed in multiple locations within a plant.

Another object of this invention is to provide a model that is of a size so as to fit on top of the in-plant C.A.M.

Another objective of the invention is to provide an audible siren consistent with the sound produced by the in-plant C.A.M. In the Eberline AMS-3 C.A.M. the siren is a single frequency bell which emits a sound pressure of approximately 100 dB at one foot. One embodiment of the invention distinguishes from the actual emergency by utilizing a two-tone warbling piezo buzzer.

Another objective of the invention is to provide a beacon that is similar but distinctive to the beacon produced by the in-plant C.A.M. In the Eberline AMS-3 C.A.M. the beacon is a red omni-directional beacon. One embodiment of the invention distinguishes from the actual emergency by utilizing an amber omni-directional light, instead of red omni-directional beacon.

It is contemplated that the invention produce warnings that are consistent with a real emergency, but being sufficiently different so that personnel do not mistake the exercise for a real emergency situation. In yet a further objective of this invention is to be self contained and provide sufficient power to operate the invention for the duration of a standard length exercise.

In view of the above, it is an object of this invention to provide a realistic scenario in order to simulate conditions present in an emergency caused by the release of unsafe levels of airborne contaminant.

DRAWINGS

These and other features, aspects, and advantages of the present invention will become better understood with regard to the following description, appended claims, and accompanying drawings where:

3

Figure 5:
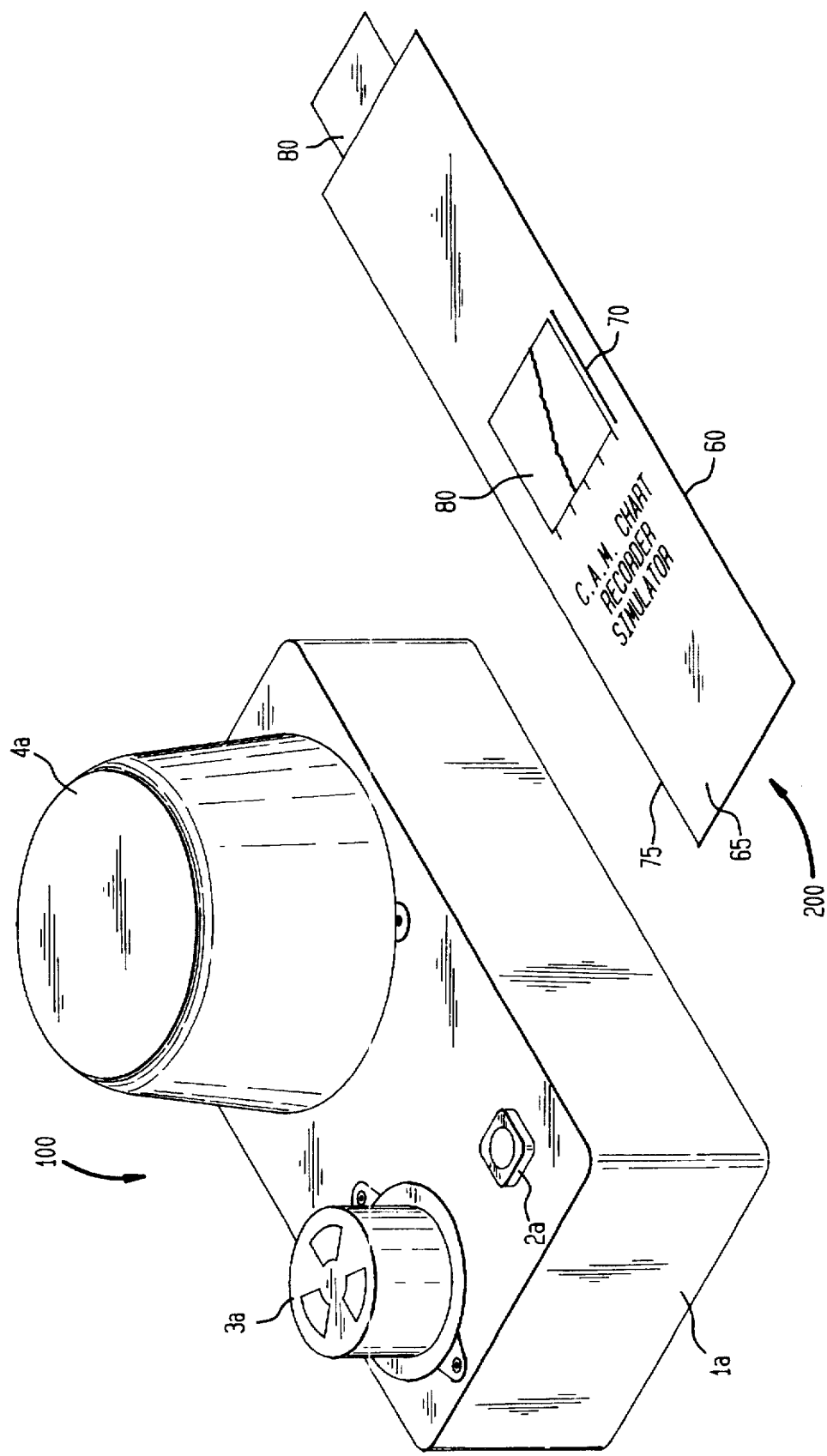
Figure 1:
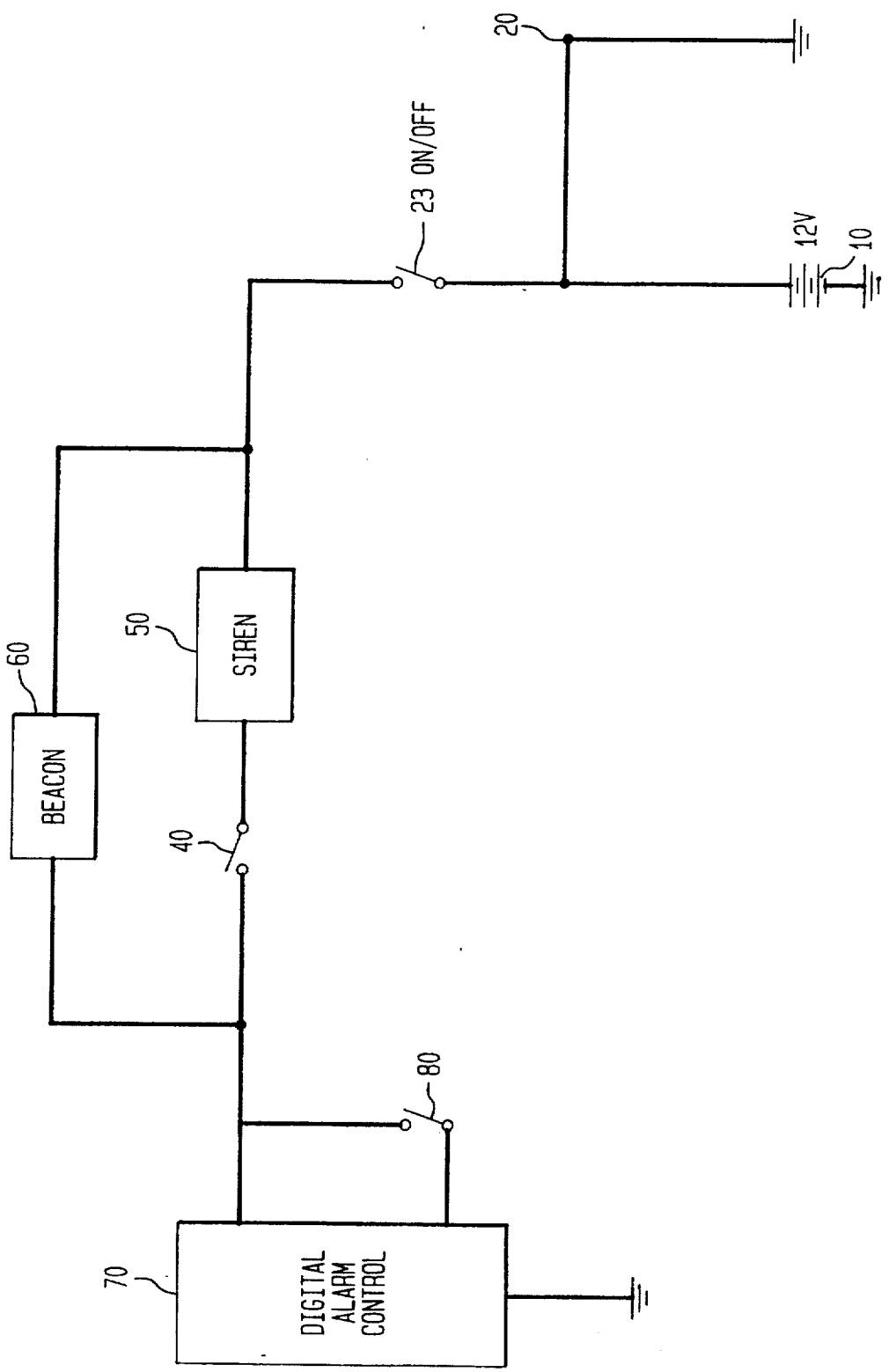
Figure 2:
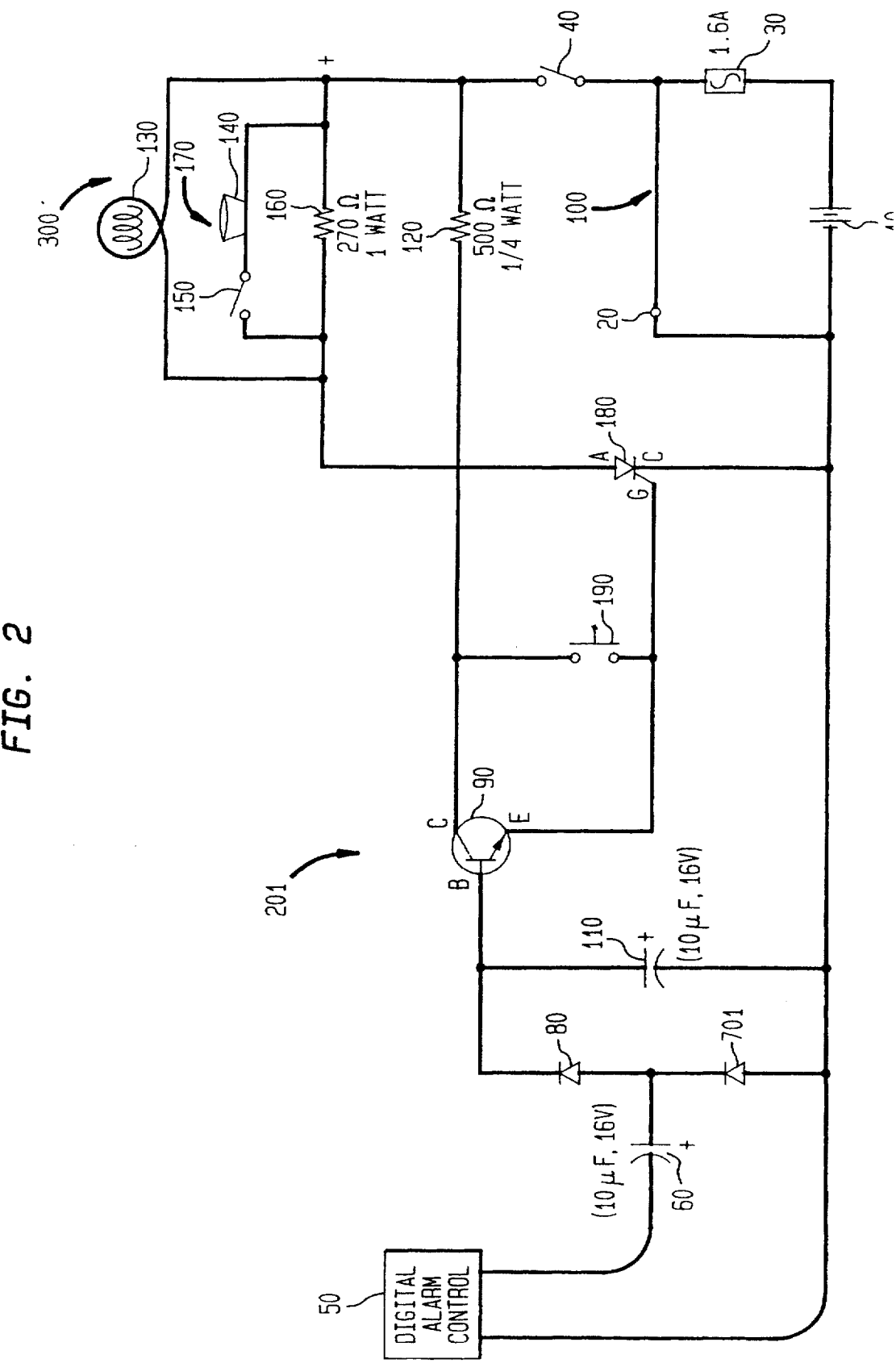
Figure 3:
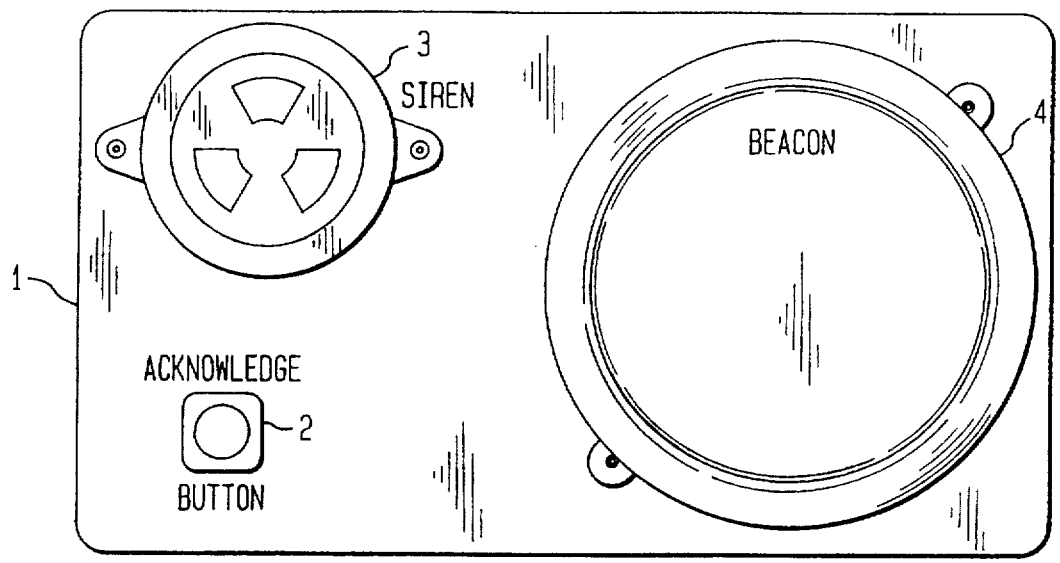
Figure 4:
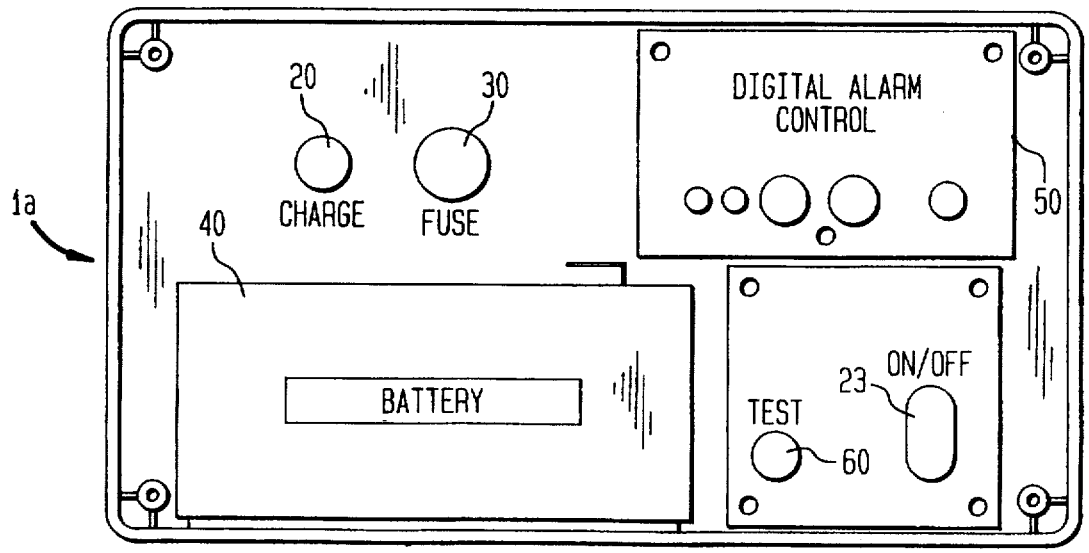

FIG. 5 shows a front view of a single version of the continuous air monitor alarm simulator together with the chart recorder simulator.

DETAILED DESCRIPTION

Figure 1:
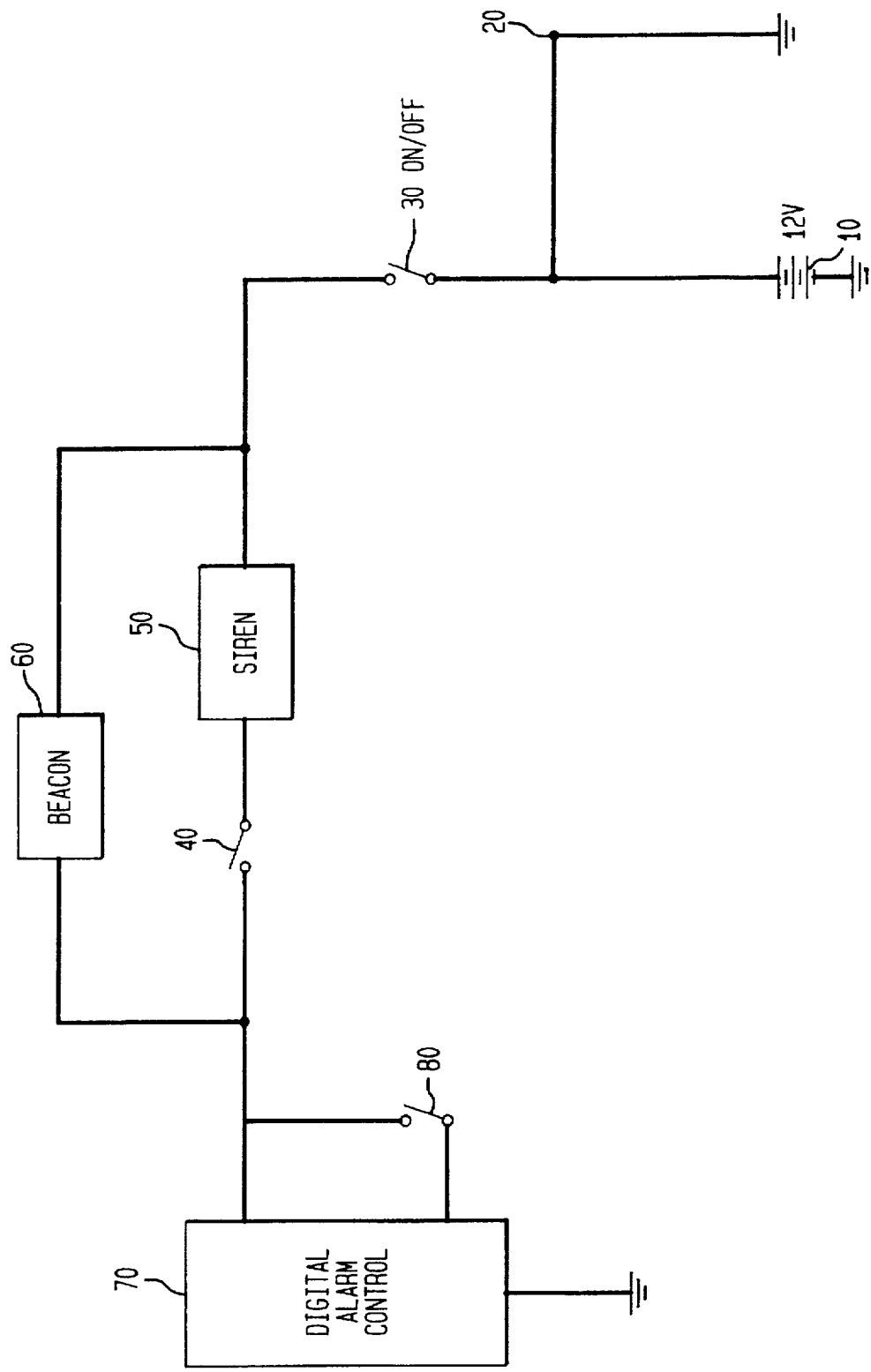
FIG. 1 shows a block diagram of a single version of the continuous air monitor alarm simulator as described herein.

FIG. 1 depicts a block diagram representation of the continuous air monitor alarm simulator. A battery 10 is coupled in series to an on/off switch 23. A battery charger 20 is coupled in parallel to the battery 10 at a junction point between the battery 10 and the on/off switch 23.

A siren 50 having a first and second end are shown in FIG. 1 and an acknowledge button 40 having a first and second end. The first end of the siren 50 is coupled in series to the on/off switch 23. The second end of the siren 50 is coupled to the first end of the acknowledge button 40 is coupled.

A digital alarm control 70 having a first end, a second end and a third end. A test button 80 having a first end and a second end. The second end of the acknowledge button 40 coupled in series to the first end of the digital alarm control 70. The test switch 80 is coupled in parallel to the first end and the second end of the digital alarm control 70. The third end of the digital alarm control 70 is coupled to ground.

A beacon 60 having a first end and a second end is also shown in FIG. 1 The first end of beacon 60 is coupled at a junction point between the first end of the siren 50 and the second end of the on/off switch 23. The second end of beacon 60 is coupled at a junction point between the second end of the acknowledge button 40 and the first end of digital alarm control 70.

The block diagram as represented in FIG. 1, functions in essentially the following manner. When the on/off switch 23 is closed and test switch 80 is open, power is provided to the digital alarm control 70. Digital alarm control 70 exists in two states, a high resistance state and a low resistance state. Generally, the digital alarm control 70 is in the high resistance state. When the digital alarm control 70 is in the high resistance state, there is not enough current available in the circuit for the siren 50 and the beacon 60 to operate. The digital alarm control 70 can be programmed to change to the low resistance state at some predetermined time. When the on/off switch 23 is closed, and the digital alarm control 70 is in the low resistance state, and acknowledge button 40 is closed, then there is sufficient current to operate both the siren 50 and the beacon 60. If the acknowledge button 40 is opened then the siren 50 is deactivated without effecting the beacon 60.

The circuit may be tested when the digital alarm control 70 is in the high resistance state. Momentarily closing the test switch 80 causes the digital alarm control 70 to switch to the low resistance state thereby causing the siren 50 and beacon 60 to operate.

Figure 2:
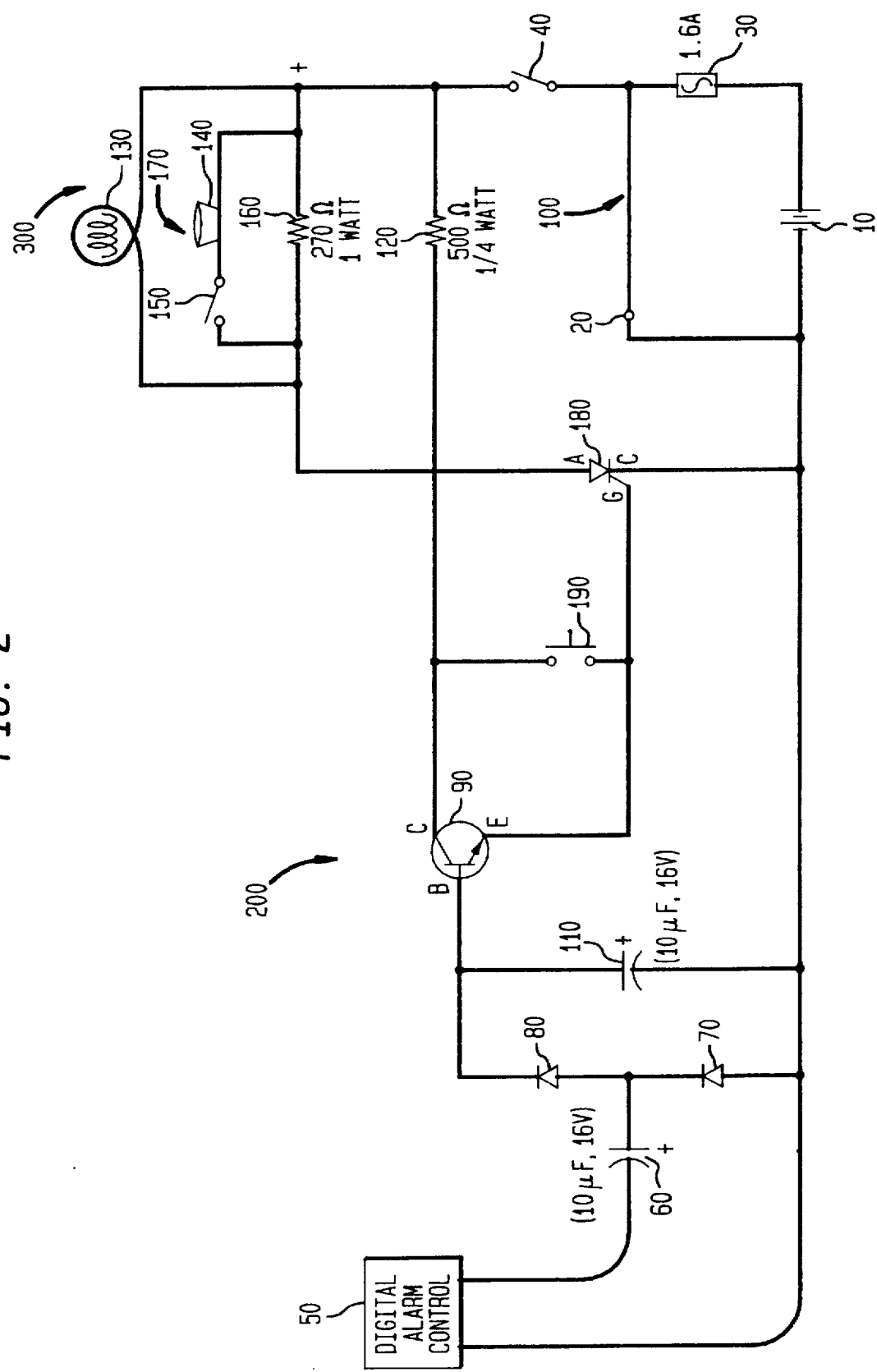
FIG. 2 shows a circuit schematic of a single version of the continuous air monitor alarm simulator as described herein.

FIG. 2 is a circuit diagram of one possible embodiment of the C.A.M. invention. In FIG. 2, a battery and charger group 100 is comprised of a 12 Volt battery 10, a battery charger 20 and a 1.6 ampere fuse 30. The battery 10 having a positive terminal and a ground. A 1.6 ampere fuse 30 having a first end and a second end. The first end of fuse 30 coupled in series to the positive terminal of the battery 10. The battery charger connection 20 coupled at one end to the second end of fuse 30 and at the other end to ground.

An on/off switch 40 having a first end and a second end. The first end of the on/off switch is coupled in series to the battery and charger group 100. A beacon and siren group 300 having an input and an output. The second end of the on/off switch 40 is coupled in series to the input of the beacon and siren group 300.

4

The beacon and siren group 300 comprise a beacon 130, an acknowledge group 170, and a resistor 160. The resistor 160 is coupled in parallel to the siren and acknowledge group 170. The siren and acknowledge group comprise a siren 140 coupled in series to an acknowledge button 150. The beacon 130 is coupled in parallel to resistor 160. A silicon controlled rectifier 180 (SCR) having an anode, a cathode and a gate. The output of the beacon and siren group 300 is coupled in series to the anode of the SCR 180. The cathode of the SCR 180 is coupled in series to ground.

A digital alarm control and test switch group 200 is comprised of a digital alarm control 50 having a first and a second terminal. The second terminal of the digital alarm control 50 is coupled to ground.

A capacitor 60 having a positive terminal and a negative terminal. The first terminal of the digital alarm control 50 is coupled in series to the negative terminal of capacitor 60. Diode 701 is coupled in series at one end to diode 80. Diode 701 is coupled at the other end to ground. The positive terminal of capacitor 60 is coupled at a junction point between diode 701 and diode 80. Diode 701 is reverse biased relative to capacitor 60 and diode 80 is in forward biased relative to capacitor 60.

A transistor 90 having a base, cathode and emitter. Diode 80 is coupled, in the forward bias direction to the base of the transistor 90. A capacitor 110 having a positive and a negative terminal. The positive terminal of the capacitor 110 is coupled at a junction point between diode 80 and the base of capacitor 90. The negative terminal of capacitor 110 is coupled to ground.

A resistor 120 having two ends. One end of resistor 120 coupled in series to the cathode of the transistor 90. The second end of the resistor 120 coupled in series to a junction point between the second end of the on/off switch 40 and the input of the beacon and siren group 300.

A test switch 190 is coupled in parallel to transistor 90. Test switch 190 having a first end and a second end. The first end of test switch 190 coupled at a junction point between the cathode of the transistor 90 and the resistor 120. The second end of the test switch 190 is coupled at a junction point between the emitter of the transistor 90 and the gate of the SCR 180.

It is contemplated that the circuit as described in FIG. 2 would function in essentially the following manner. The on/off switch 40 is shorted, this provides power to the digital alarm control 50 and the test switch group 200. The digital alarm control 50 and test switch group 200 normally maintain the circuit in an open state relative to the beacon and siren group 300. The digital alarm control 50 can be programmed to complete the circuit at some predetermined time. When the digital alarm control 50 engages it causes the transistor 90 to supply sufficient voltage to the gate of the SCR 180 to complete the circuit and power is provided to the beacon and siren group 300. Initially, the acknowledge button 150 is in the closed position. When the circuit is activated the beacon 130 and the siren 140 begin to operate. During operation of the C.A.M. simulator, the acknowledge button 150 can be engaged. Engaging the acknowledge button 150 results in an open of the acknowledge and siren group 170, such that the siren 140 is deactivated and the beacon 130 is unaffected.

Operation of the circuitry may be tested when the on/off switch 40 is closed and the digital alarm control 50 and test switch group 200 is open relative to the beacon siren group 300. Test switch 190 is momentarily engaged, causing the SCR 180 to switch to the low resistance state thereby completing the circuit relative to the beacon siren group 300. The beacon 130 and the siren 140 will operate in the same manner as they would if the digital alarm control 50 had caused the SCR 180 to switch to the low resistance state thus completing the circuit. In this manner the operation of the device can be tested without altering the setting on the digital alarm control 50.

Figure 3:
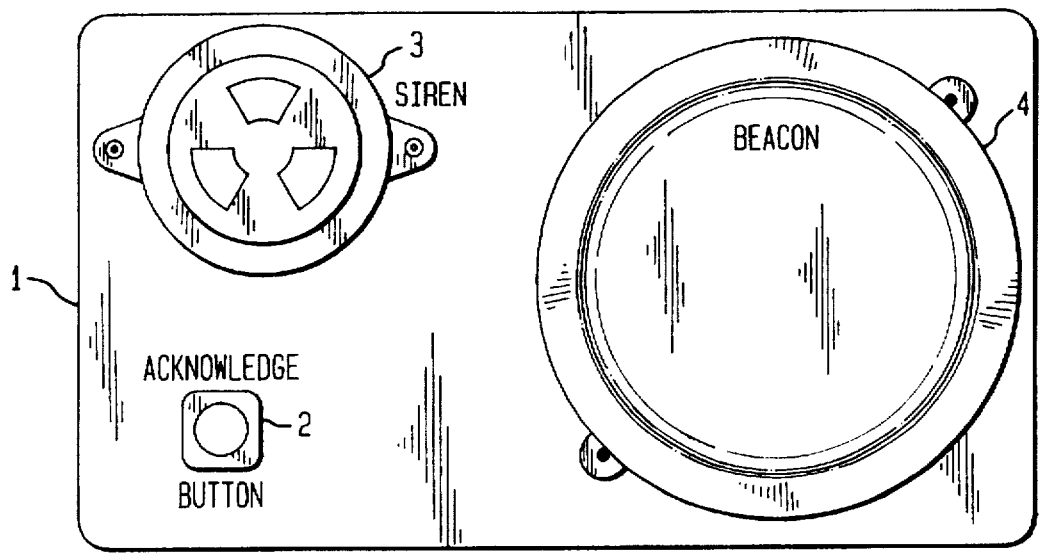
FIG. 3 shows a top view of a single version of the continuous air monitor alarm simulator as described herein.

FIG. 3 shows a top view of a single version of the C.A.M. alarm simulator, having a clear housing 1. A siren 3 is fastened to the top of the housing 1. A transparent, non-red, beacon 4, colored amber, for example, is also fastened to the top of the housing 1. Acknowledge button 2 is mounted through an opening in the housing 1. The acknowledge button 2 is accessible from the outside of the housing 1.

Figure 4:
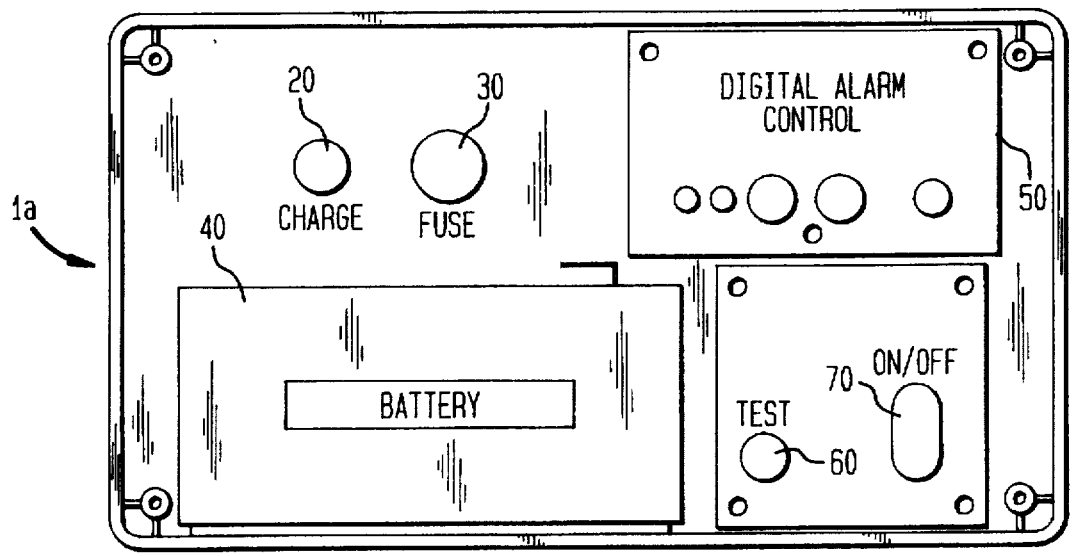
FIG. 4 shows a bottom view of a single version of the continuous air monitor alarm simulator as described herein.

FIG. 4 shows a bottom view of a single version of the C.A.M. alarm simulator, having a clear housing 1a with a visible cavity defined therein. The following elements are contained and affixed within the cavity. A charge input 20, a fuse 30, a battery 40, a digital alarm control 50, a test switch 60 and an on/off switch 23.

FIG. 5 shows a front view of a single version of the C.A.M. alarm simulator 100 together with the chart recorder simulator 201. The C.A.M. alarm simulator having a housing 1a. A siren 3a and a beacon 4a are fastened to the top portion of the housing 1a. An acknowledge button 2a is shown mounted through an opening in the housing 1a.

The chart recorder simulator 201 is comprised of a chart holder 60 having a front portion 65 and a rear portion 75. The front portion 65 and the rear portion 75 are fastened together forming a cavity therein. An outer portion 60 is formed of laminated card stock and poster board with a window 703 formed as an integral part of the front portion 65. A chart 80 positioned within the cavity so that any markings on the chart 80 can be viewed through the window 703. The chart 80 can be advanced in order to expose additional entries on the chart 80.

In summary, shown in FIG. 5 is the simulated continuous air monitor device and chart recorder simulator made of an amber beacon; a two-tone siren; and a rechargeable internal power source wherein the beacon and the siren are electrically connected to the internal power source. As shown in FIG. 2, the device of FIG. 5 is further constructed with an activation means for activating the beacon and the siren at some predetermined time which is connected to a test switch adapted to electrically bypass the activation means such that engagement of the test switch permits activation of the siren and the beacon. The siren is coupled to an acknowledgment means such that engagement of the acknowledgment means deactivates the siren while permitting the beacon to continue in operation. A chart recorder simulator is shown situated beside the monitoring device in the same field of view and is made up of a chart recorder simulator with means for simulating the current reading and trend of the airborne contamination as required by the specific needs of the exercise.

Although the present invention has been described in considerable detail with reference to certain preferred versions thereof, other versions are possible. It is therefore to be understood that within the scope of the appended claims the invention may be practiced otherwise than as specifically described.

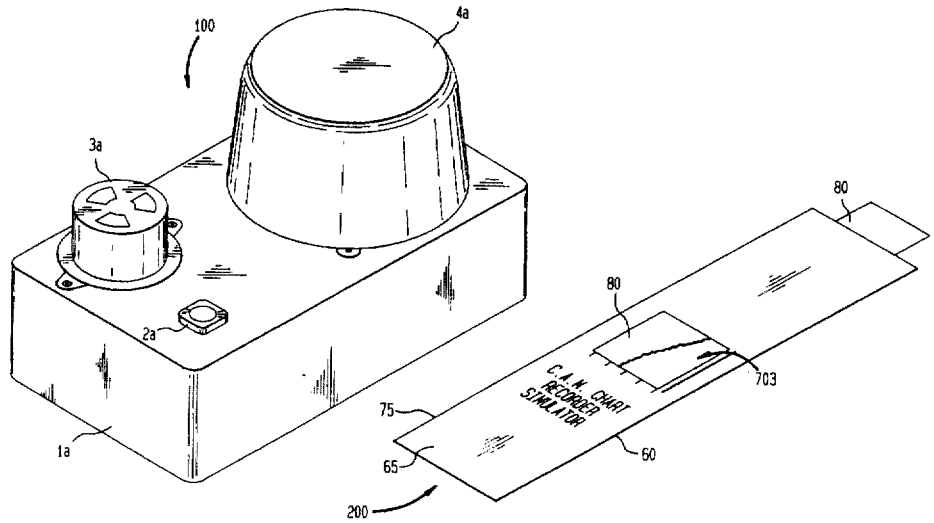

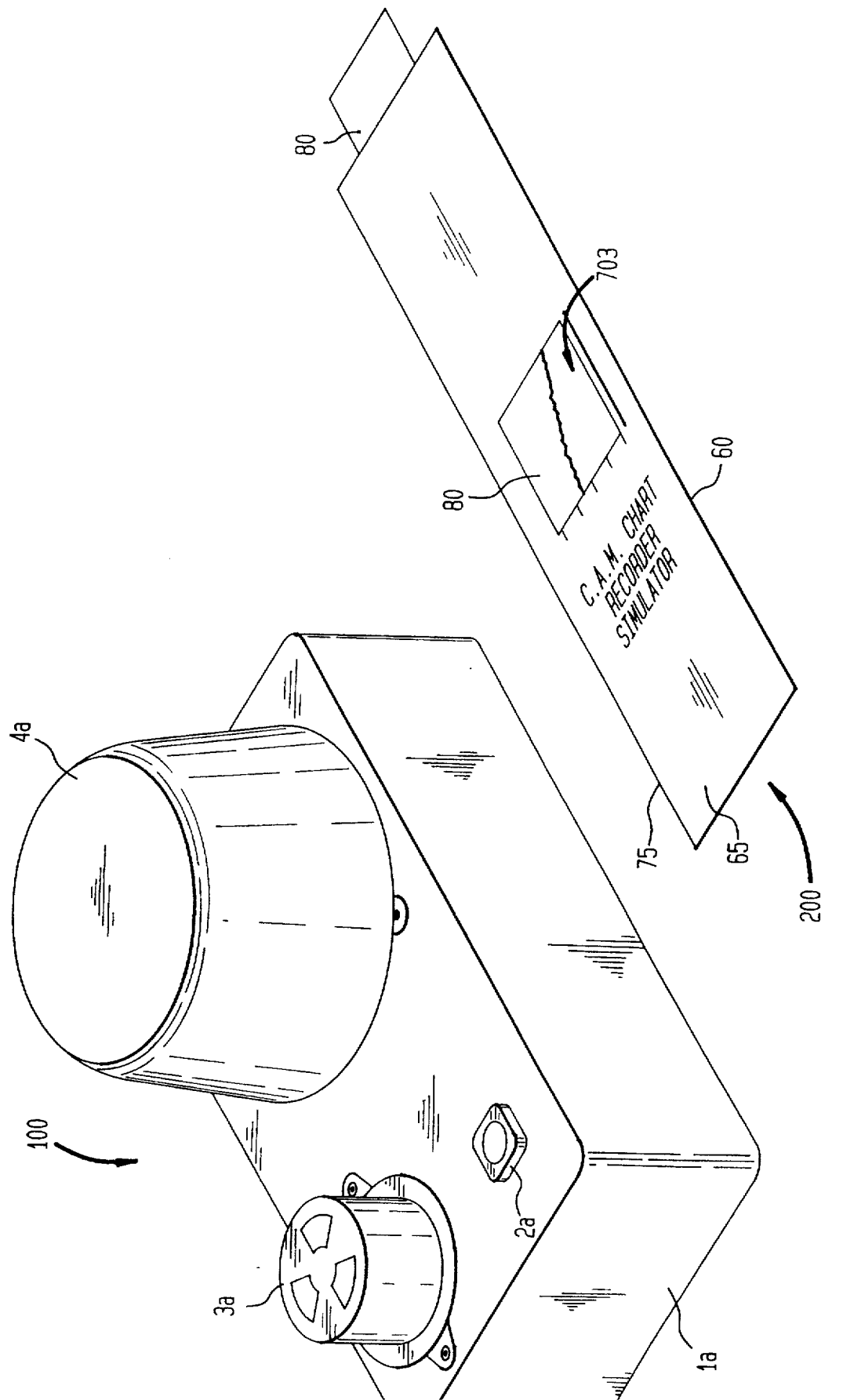

I claim:

1. A portable apparatus comprising means for simulating a detector adapted to selectively indicate a detection of the presence of airborne radioactivity via an audible alarm and a visual alarm, the apparatus being adapted for use in a secured facility housing a nuclear powered electrical generation plant, the apparatus being self-contained in a housing, the apparatus being adapted such that its internal parts are visible through its housing, the apparatus being comprised of an internal power supply and further comprising:

a. a beacon;
   b. a siren;
   c. an acknowledgment button;
   d. a time activation means;
   e. a clear housing;
   a means to electrically connect said beacon, said siren, said acknowledge button, said power supply, and said time activation means within the housing such that said beacon and said siren are powered by said power supply;
   wherein said time activation means is capable of accepting programming such that said beacon and said siren commence continuous operation at a predetermined future time;
   wherein the engagement of the acknowledge button discontinues the operation of the siren without affecting the continued operation of the beacon; and wherein said power supply is rechargeable.

2. An apparatus as claimed in claim 1, wherein said siren comprises a two-tone warbling piezoelectric buzzer, the apparatus further including an on/off switch electrically connected to said buzzer such that said buzzer can be activated and deactivated.

3. An apparatus as claimed in claim 2, further including a means for testing operation of the apparatus such that operation of the siren and the beacon can be tested when the on/off switch is activated such that the programming of the time activation device remains unchanged.

4. An apparatus as claimed in claim 3, having a size and a shape less than about 5" wide, about 8" long, about 3" high and a weight of less than 10 pounds wherein the weight, size and shape of said housing are each adapted such that a plurality of the apparatus can be simultaneously transported and deployed by one person and such that each apparatus deployed in the facility is adapted to sit on top of an actual airborne radiation detector.

5. A method for simulating an emergency and an alarm indicative of a leak of airborne radioactive material within a nuclear facility comprising the step of using a continuous air monitor alarm simulator and a chart recorder simulator together and further comprising the additional steps of:

a. programming at least one continuous air monitor alarm simulator to activate a beacon and a siren at a predetermined time;
   b. completing the chart recorder simulator to indicate an air quality emergency; one chart recorder simulator is completed for each of the continuous air monitor alarm simulators;
   c. placing the continuous air monitor alarm simulator and chart recorder simulator pair at various points throughout the facility;
   d. activating the beacon and the siren at the predetermined time such that an airborne radiation emergency is simulated;
   e. engaging an acknowledge button at some point subsequent to the activation of the continuous air monitor alarm simulator such that the siren is deactivated and operation of the beacon is unaffected; and
   f. manipulating the chart recorder simulator so that it appears that the quality of the air within the facility varies over time.

6. A portable apparatus having a plurality of parts, the apparatus comprising means for simulating a detector adapted to selectively indicate a detection of airborne radioactivity via an audible alarm and a visual alarm, the apparatus being adapted for emergency manual transport into and out of a secured facility housing a nuclear powered electrical generation plant, the apparatus being self-contained in a transportable housing, the apparatus being further adapted such that all of the parts are visible.

7. The portable apparatus of claim 6 wherein the transportable housing is made of a clear material and wherein the portable apparatus further comprises an internal power supply, a visual alarm, an acoustic alarm, a disengagement means for disconnecting said acoustic alarm, a testing means for momentarily activating the visual alarm and the acoustic alarm, a time activation means, an acknowledge switch; a connecting means for electrically connecting said visual alarm, said acoustic alarm, said acknowledge switch, said internal power supply, and said time activation means within the transportable housing; said visual alarm and said acoustic alarm being powered by said internal power supply; said time activation means being adapted to accept programming to start said visual alarm and said acoustic alarm at a predetermined time; the apparatus when activated being further adapted to discontinue the operation of the acoustic alarm via said disengagement means without affecting the continued operation of the visual alarm.

8. The portable apparatus of claim 7 wherein the disengagement means comprises a disengagement switch connected in series with said acoustic alarm.

9. The portable apparatus of claim 8 wherein the disengagement switch is normally closed.

10. The portable apparatus of claim 9 wherein the acoustic alarm and the visual alarm are connected in parallel.

11. The portable apparatus of claim 10 further comprising a distinguishing means for distinguishing the portable apparatus when activated from an actual activated continuous air monitor.

* * * * *

UNITED STATES PATENT AND TRADEMARK OFFICE
CERTIFICATE OF CORRECTION

PATENT NO.  : 5,767,777
INVENTOR(S) : Jeffrey L. Whitehead
DATED       : June 16, 1998

It is certified that error appears in the above-identified patent and that said Letters Patent is hereby corrected as shown below:

The Title page should be deleted and substitute therefore the attached Title page:

Drawings:

Figure 1 "30 ON/OFF" should be changed to "23 ON/OFF"
Figure 2 "70" should be changed to "701"
Figure 4 "70" should be changed to "23"
Figure 5 "70" should be changed to "703",
as per attached pages.

Signed and Sealed this

Thirty-first Day of August, 1999

Attest:

Q. TODD DICKINSON

*Attesting Officer*    Acting Commissioner of Patents and Trademarks

United States Patent
Whitehead

[11] Patent Number: 5,767,777
[45] Date of Patent: Jun. 16, 1998

[54] CONTINUOUS AIR MONITOR ALARM SIMULATOR AND CHART RECORDER SIMULATOR

[75] Inventor: Jeffrey L. Whitehead, Elizabethtown, Pa.

[73] Assignee: GPU Nuclear, Inc., Parsippany, N.J.

[21] Appl. No.: 676,064

[22] Filed: Jul. 5, 1996

Related U.S. Application Data

[60] Provisional application No. 60/001,662, Jul. 31, 1995.
[51] Int. Cl.$^6$ .................................................. G08B 17/10
[52] U.S. Cl. .................... 340/632; 340/693; 73/23.42; 364/497; 364/550
[58] Field of Search .................... 340/632, 600, 340/426, 438, 439, 945, 693, 539; 73/23.21, 23.42; 364/510, 497, 550

[56] References Cited

U.S. PATENT DOCUMENTS

| | | |
|---|---|---|
| 3,061,945 | 11/1962 | Hawkins . |
| 3,839,804 | 10/1974 | Amend et al. . |
| 4,032,707 | 6/1977 | Trenary . |
| 4,064,392 | 12/1977 | Desalu . |
| 4,257,039 | 3/1981 | Webb et al. . |
| 4,845,474 | 7/1989 | Moore et al. . |
| 4,932,879 | 6/1990 | Ingenito . |
| 5,008,840 | 4/1991 | De Pierro ............... 340/577 |
| 5,045,700 | 9/1991 | Crowson et al. . |
| 5,138,302 | 8/1992 | Nagaoka et al. . |
| 5,146,209 | 9/1992 | Beghelli ............... 340/632 |
| 5,160,264 | 11/1992 | Banura et al. . |
| 5,160,916 | 11/1992 | Ishii et al. . |
| 5,170,150 | 12/1992 | Austin et al. . |
| 5,302,837 | 4/1994 | Sawa et al. . |
| 5,327,119 | 7/1994 | Ishii . |
| 5,331,310 | 7/1994 | Setter et al. . |
| 5,345,479 | 9/1994 | *aham . |
| 5,379,026 | 1/1995 | Whittle ............... 340/632 |
| 5,382,943 | 1/1995 | Tanaka ............... 340/632 |
| 5,389,125 | 2/1995 | Thayer et al. ............... 95/11 |
| 5,400,014 | 3/1995 | Behlke et al. . |
| 5,406,265 | 4/1995 | Trozzo et al. ............... 340/632 |
| 5,452,234 | 9/1995 | Heath et al. ............... 340/632 |
| 5,608,384 | 3/1997 | Tikijian ............... 340/632 |

*Primary Examiner*—Jeffery Hofsass
*Assistant Examiner*—Davetta Woods
*Attorney, Agent, or Firm*—William L. Muckelroy; Gary L. Lipson

[57] ABSTRACT

A method and a system for simulating the conditions that are present during an air quality emergency occurring in a nuclear powered electrical generation plant. The system uses an apparatus which includes a continuous air monitor (C.A.M.) alarm simulator and chart recorder simulator. The C.A.M. alarm simulator comprises a beacon, a siren, an acknowledge button, an internal power source and a digital alarm control. The C.A.M. alarm simulator is capable of being programmed to activate at some predetermined time. The chart recorder simulator is comprised of a chart holder with a window formed therein. A chart indicating the simulated level of airborne nuclear radiation contamination is placed inside the chart holder so that it can be viewed though the window. The chart holder is placed in visual proximity to the C.A.M. alarm simulator. Simulating the air quality emergency comprises the following steps: At least one C.A.M. alarm simulator is programmed to activate at a predetermined time; a corresponding chart recorder simulator is completed to indicate a specific air quality emergency; a C.A.M. alarm simulator and chart recorder simulator are placed at each of various locations within the plant; the C.A.M. alarm simulators activate at the predetermined time; the acknowledge button on each of the C.A.M. alarm simulators are engaged to discontinue the siren while not affecting operation of the beacon; and finally the user periodically advances the charts indicating changing air quality conditions over time.

11 Claims, 4 Drawing Sheets